Patented July 18, 1939

2,166,125

UNITED STATES PATENT OFFICE 2,166,125

PRESERVATION AND UTILIZATION OF STYRENE

Joseph W. Britton, Ralph F. Prescott, and Robert C. Dosser, Midland, Mich., assignors to The Dow Chemical Company, Midland, Mich., a corporation of Michigan No Drawing. Application August 28, 1936, Serial No. 98,340

2 Claims. (Cl. 202—57)

This invention concerns a new method for preserving styrene in unpolymerized form and thereafter utilizing the styrene in making polymerized products therefrom.

It is well known that styrene tends to polymerize on standing with formation of an at least partially polymerized body which is unsatisfactory for the preparation of a number of products that may be prepared from pure styrene. In order to prevent such polymerization, it is usual practice to add to freshly prepared styrene any of a number of organic agents, such as quinone, hydroquinone, etc., which are known to inhibit the polymerization. Such organic inhibiting agents add materially to the cost of the styrene product and frequently cannot be separated from the latter to recover the styrene in pure and readily polymerizable condition. For instance, styrene which has been treated with quinone cannot satisfactorily be purified by distillation.

We have now discovered that finely divided sulphur may be dissolved in styrene to form a solution which is substantially stable against polymerization and that the styrene may thereafter be recovered in good yield and in a pure and readily polymerizable form by distillation from the sulphur. The invention, then, consists in the method of preserving and utilizing styrene hereinafter fully described and particularly pointed out in the claims.

A styrene solution which is relatively stable against polymerization is prepared by dissolving sulphur in styrene. Solution of the sulphur in styrene may be brought about by agitating or grinding a mixture of sulphur and styrene or by merely permitting such mixture to stand for some time. Finely divided sulphur, e. g. flowers of sulphur or colloidal sulphur, dissolve more readily than do the coarser forms of sulphur, but sulphur in any form may be employed. A mere trace, e. g. 0.001 per cent by weight, of dissolved sulphur is sufficient to inhibit the polymerization of styrene to appreciable extent, but in practice we prefer to dissolve at least 0.01 per cent by weight of sulphur in the styrene.

The solution of sulphur in styrene prepared as just described may be stored at room temperature over long periods of time, e. g. for weeks or months, without becoming polymerized to any considerable extent. When it is desired to employ the styrene in making polymerized products, the styrene may be distilled from the solution without appreciable polymerization thereof occurring, the sulphur serving as an inhibitor to prevent polymerization of the styrene during the distillation. The distillation for the recovery of the styrene in pure and uninhibited form may be carried out at atmospheric pressure but is preferably carried out under vacuum at temperatures below 100° C. so as to reduce the amount of polymerization which may occur to a minimum.

The comparative experiments described in the following example illustrate the degree to which styrene is inhibited against polymerization by dissolving sulphur therewith.

Example

Three samples of styrene, one containing no inhibitor, the second containing 0.01 per cent by weight of dissolved sulphur, and the third containing 0.1 per cent by weight of sulphur, a portion of which was not in solution, were each heated at 90° C. for 5 hours, after which the proportion of styrene in each sample which had become polymerized was determined by analysis. It was found that 41 per cent of the styrene in the sample containing no sulphur had been polymerized; 21 per cent of the styrene in the sample containing 0.01 per cent of sulphur was polymerized and only 1 per cent of the styrene in the sample containing 0.1 per cent by weight of sulphur had been polymerized.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. The method which comprises dissolving sulfur in unpolymerized styrene to form a solution consisting of styrene and a small amount of sulfur in at least 0.01 per cent by weight concentration and thereafter distilling styrene from the solution to recover the styrene as a distillate in readily polymerizable form.

2. The method which comprises distilling a solution consisting of styrene to which sulfur has been added in a small amount as a polymerization inhibitor to recover the styrene as a distillate in polymerizable form.

JOSEPH W. BRITTON.
RALPH F. PRESCOTT.
ROBERT C. DOSSER.